United States Patent Office 3,356,770
Patented Dec. 5, 1967

3,356,770
DI[DIHYDROCARBYLPHOSPHITO CYCLOHEXYL (PHENYL)]ALKYLIDENE
Millard S. Larrison, Livingston, N.J., assignor, by mesne assignments, to First National Bank of Morgantown, Morgantown, W. Va., and Small Business Administration, Richmond, Va.
No Drawing. Filed June 18, 1964, Ser. No. 376,202
4 Claims. (Cl. 260—930)

ABSTRACT OF THE DISCLOSURE

Compounds having the formula

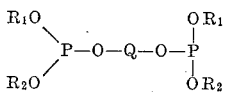

where $R_1$ and $R_2$ are selected from the group consisting of alkyl, aryl and haloaryl and at least two of $R_1$ and $R_2$ are alkyl and Q is the divalent residue of a member of the group consisting of a dihydric phenol and a hydrogenated dihydric phenol are prepared by reacting 2 mols of a tertiary phosphite with one mol of the appropriate dihydric phenol or hydrogenated dihydric phenol. The compounds are useful as stabilizers for vinyl chloride resins and hydrocarbon polymers.

---

This application is a continuation-in-part of application Serial No. 366,891 filed May 12, 1964.

This invention relates to novel phosphite polymers.

In the thermoplastics industry, stabilization of the thermoplastic resins, e.g. polyvinyl chloride and polypropylene, by the use of barium, cadmium, zinc, tin, lead and phosphite systems to prevent degradation from heat, light and weathering has contributed to the rapid growth into markets which were earlier closed to many plastics and has also greatly accelerated the rate of growth in many established areas.

The incorporation of liquid organic phosphates, e.g. see Leistner Patent 2,564,646, in stabilizing vinyl chloride resins has given spectacular improvements. However, in many cases the liquids are difficult or impossible to use and as a result many attempts have been made to prepare the organic phosphite in solid form, preferably as a hard, frangible material that can be easily ground or powdered. These efforts have met with indifferent successive in that the solids have been soft, waxy, unctuous, difficult to maintain in finely divided condition and/or susceptible to rapid hydrolysis.

It is an object of the present invention to make novel polymeric phosphites.

Another object is to make solid phosphites that can be incorporated into various plastic and elastic compositions as stabilizers.

An additional object is to prepare novel phosphite polymers having improved resistance to hydrolysis.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting a trihydrocarbyl phosphite or trihaloaryl phosphite with a dihydric phenol, an aromatic dihydric alcohol or a hydrogenated dihydric phenol, i.e. a dihydric alcohol resulting from the hydrogenation of a dihydric phenol (also called a hydrogenated bisphenol).

The reaction is preferably catalyzed with 0.1–5% by weight of the trihydrocarbyl phosphite of a dialkyl phosphite, a diaryl phosphite, a dihaloaryl phosphite or of an alkaline catalyst such as an alkali metal alcoholate or phenolate. As examples of catalysts there can be used diphenyl phosphite, didecyl phosphite, phenyl decyl phosphite, di (2-methylphenyl) phosphite, di (4-dodecylphenyl) phosphite, di (2-chlorophenyl) phosphite, di (2,4-dimethylphenyl) phosphite, di (4-bromophenyl) phosphite, diethyl phosphite, dicyclohexyl phosphite, diocta-decyl phosphite, sodium phenolate, sodium decylate, potassium cresylate, sodium ethylate and sodium octadecanolate. Diphenyl phosphite and similar diaryl phosphites are the preferred catalysts.

It has been proposed previously to prepare polymeric pentaerythritol phosphite esters by reacting diphenyl pentaerythritol diphosphite and the like with a dihydric phenol or dihydric alcohol, Friedman Patent 3,053,878. The compounds of the present invention have superior hydrolytic stability to those of the Friedman patent.

As the trihydrocarbyl or trihaloaryl phosphite reactant there can be used triphenyl phosphite, tris (2-methylphenyl) phosphite; tris (3-methylphenyl) phosphite, tris (4-methylphenyl) phosphite, tris (2-ethylphenyl) phosphite, tris (2-isopropylphenyl) phosphite, tris (4-dodecylphenyl) phosphite, tris (2,4-dimethylphenyl) phosphite, tris (2-chlorophenyl) phosphite, tris (2-bromophenyl) phosphite, tris (2-fluorophenyl) phosphite, tris (4-t-butylphenyl) phosphite, tris decyl phosphite, tris octyl phosphite, tris (alpha naphthyl) phosphite, diphenyl 4-methylphenyl phosphite. The preferred phosphite reactants are triaryl phosphites, most preferably triphenyl phosphite.

As the diol reactant there can be used p-xylylene glycol, m-xylylene glycol, o-xylylene glycol, bis (4-hydroxyphenyl) dimethyl methane (bisphenol A) and other di (hydroxyaryl) alkylidenes such as di (4-hydroxy-3-methylphenyl) dimethyl methane, di (4-hydroxy-3-methylphenyl) methyl methane, di (p-hydroxyphenol) methyl ethyl methane, di (4-hydroxy-3-methylphenyl) phenyl methane, di (4-hydroxyphenyl) methane, di (4-hydroxyphenyl) sulfone, di (4-hydroxyphenyl) sulfide, di (4-hydroxyphenyl) sulfoxide, di (3-hydroxyphenyl) dimethyl methane, tetrachloro bisphenol A, tetrabromo bisphenol A, 4,4'-methylene bis-(2-methyl-6-t-butylphenol), di(4-hydroxyphenyl) ether, resorcinol, hydroquinone, catechol, dihydroxydiphenyl, 4,4'-isopropylidene dicyclohexanol (also called bis (4-hydroxycyclohexyl) dimethyl methane or hydrogenated bisphenol A), 1,4-cyclohexane dimethanol, di (p-hydroxycyclohexyl) methyl ethyl methane, di (4-hydroxycyclohexyl) methane, di (3-hydroxycyclohexyl) dimethyl methane. The preferred dihydric compound is hydrogenated bisphenol A since it gives the best products.

To prepare the compounds of the present invention there are employed 0.5 to 1.5 mol of trihydrocarbyl phosphite or the like per mol of the dihydric compound, e.g. hydrogenated bisphenol A. Preferably there are used about 2 moles of trihydrocarbyl phosphite for 3 moles of diol, e.g. hydrogenated bisphenol A.

The reaction can be continued until a cross linked or highly branched polymer is formed. Preferably, however, the reaction is stopped while the product is still in the substantially linear or thermoplastic stage. When using the preferred reactants, namely hydrogenated bisphenol A and triphenyl phosphite, the reaction is stopped while the product has 6.3–6.8% phosphorus by weight. Thus, under the preferred conditions, the reaction is stopped when 65–75% of the theoretical amount of phenol derived from the triphenyl phosphite or the like is removed by distillation.

The reaction can be continued until 90% of the theoretical amount of phenol (i.e. from triphenyl phosphite) has been recovered but this is not preferred since it gives a cross linked thermosetting polymer. It is also possible to stop the reaction when only 50% of the theoretical amount of phenol has been recovered but in such case the thermoplastic polymer usually has not advanced to a stage giving optimum properties.

When using triphenyl phosphite and hydrogenated bisphenol A as the reactants, it has been observed that the greater the amount of phenol removed within the limits of 6.3 to 6.8% phosphorus content in the polymer formed, the less the color of the polymer. If the distillation is continued much beyond the point of 6.8% phosphorus content in the polymer, gel-like, i.e. cross linked materials, are formed rather than the preferred thermoplastic materials. The reaction is normally carried out with the aid of heat. The reaction can be continued as long as the phenol by-product is removed. Conveniently the phenol formed is removed by vacuum distillation, e.g. using a vacuum equivalent to 15 mm. absolute pressure or less.

Many of these polymers are new materials. Thus the phosphite polymers from the hydrogenated dihydric phenols, e.g. hydrogenated bisphenol A are new.

Some of the polymers from dihydric phenols are closely related to the phosphite polymers disclosed in Nelson Patent 2,612,488. The procedure for making the dihydric phenol polymeric phosphites of Nelson, however, is more cumbersome than that used in the present invention and the use of phosphorus trichloride or the like also creates problems in obtaining a pure halogen free product. This is particularly true if the reaction is stopped prior to completion as is done in the present invention to get the preferred thermoplastic polymers.

The Nelson procedure also cannot be employed with the aromatic dihydric alcohols or the cycloaliphatic dihydric alcohols employed in the present invention because the alcohols react with phosphorus trichloride or the like to form organic halides. These in turn can react further to form phosphonates rather than the desired thermoplastic polymeric phosphites.

The products obtained according to the invention are brittle solid resins at room temperature. They can be readily ground for incorporation in an amount of 0.01 to 20% into halogen containing resins, e.g. vinyl chloride resins, as stabilizers against heat and light. They can also be incorporated in an amount of 0.01 to 20% as stabilizers for hydrocarbon polymers such as polyethylene, polypropylene, ethylene-propylene copolymers (e.g. a 50:50 copolymer), polystyrene, acrylonitrile-butadiene-styrene terpolymer natural rubber, rubbery butadiene-styrene copolymer, polybutadiene, polyisobutylene, isobutylene-butadiene copolymer (butyl rubber) and the like. In some instances it is desirable to also incorporate a phenolic antioxidant such as 2,2-methylene bis (4-methyl-6-t-butyl phenol) or 2,4,6-tri-t-butylphenol.

The products can also be used as antioxidants with barium, cadmium and zinc salts and synergistic activity has been noted in this connection. Thus there can be included 1–10% of salts such as barium-cadmium laurate, zinc stearate, cadmium 2-ethylhexoate, barium nonylphenolate barium octylphenolate, barium stearate, zinc octoate in the antioxidant formulations.

The resins of the present invention can also be incorporated in an amount of 1 to 50% in other plastic materials to give improved flame and/or fire resistance. Thus they can be used to improve the fire resistance of cellulose, cellulose acetate, cellulose nitrate, cellulose acetate-butyrate, polystyrene, polyethylene, polypropylene and other polymeric monoolefins.

The resins of the present invention are also suitable to form cast or molded articles, e.g. disposable cups.

The initial heating for the reaction is preferably done slowly to avoid an explosion. After initial reaction at about 100 to 110° C., the reaction mass is heated above 150° C., e.g. to 180° C., and then vacuum distilled to remove the by-product phenol.

Unless otherwise indicated, all parts and percentages are by weight.

*Example 1*

240 parts of hydrogenated bisphenol A, 341 parts of triphenyl phosphite, 84 parts of t-octylphenol and 6 parts of diphenyl phosphite were mixed and subjected to vacuum distillation until the temperature reached 214° C. with a vacuum of 29.5 inches. 222 parts of distillate were removed. The residue was a solid polymer with a phosphorus content of 7.6%. It was compatible in resins, e.g. polyvinyl chloride, and polypropylene and natural and synthetic rubbers and exerted a stabilizing effect. It was particularly effective in combination with conventional stabilizing systems such as phenols and barium and cadmium soaps.

*Example 2*

775 parts of triphenyl phosphite, 480 parts of hydrogenated bisphenol A and 10 parts of diphenyl phosphite were mixed and subjected to vacuum distillation. Terminal conditions were 208° C. and 29.5 inches of vacuum. 363 parts of phenol were removed from the system. The residue was a resinous polymer with a phosphorus content of 8.7%.

*Example 3*

341 parts of triphenyl phosphite, 240 parts of hydrogenated bisphenol A, and 6 parts of diphenyl phosphite were mixed and subjected to vacuum distillation. Terminal conditions were 216° C. and 29.5 inches of vacuum. The residue was a resinous polymer with a phosphorus content of 8.4%.

*Example 4*

1860 parts of triphenyl phosphite, 2160 parts of hydrogenated bisphenol A and 24 parts of diphenyl phosphite were mixed and subjected to vacuum distillation as in Example 3. 1112 parts of phenol distillate were removed. The residue was a hard amber-colored resin with a phosphorus content of 6.3%. The product is one of the preferred ones according to the invention and was compatible with and displayed anti-oxidant activity in stabilizing plastics, e.g. polyvinyl chloride, polyethylene, polypropylene, natural rubber and synthetic rubber. It was particularly effective in plastics when used in combination with conventional barium, zinc and cadmium stabilizers.

Example 5

62 parts of triphenyl phosphite were mixed with 41 parts of p-xylylene glycol. The temperature was maintained in the temperature range, 100 to 110° C. for 20 minutes. The glycol dissolved slowly to give a clear viscous liquid. The temperature was then slowly raised to 115° C. and finally to 220° C. The product was finally distilled under 5 mm. Hg pressure at 200° C. The final product was a light colored, brittle solid, at room temperature and had a phosphorus content of 11%.

Example 6

465 parts of triphenyl phosphite and 456 parts of bisphenol A were mixed and subjected to vacuum distillation. Terminal conditions were 200° C. and 5 mm. Hg absolute pressure. 385 parts of phenol were removed. The product was a slightly yellow resinous polymer containing 7.3% phosphorus. It was compatible in natural and synthetic rubbers, e.g. butadiene-styrene copolymer, and in polyvinyl chloride and acrylonitrile-butadiene-styrene resins.

Example 7

240 parts of hydrogenated bisphenol A, 326 parts of triphenyl phosphite and 4 parts of diphenyl phosphite were mixed and subjected to vacuum distillation. Terminal conditions were 210° C. and 29.5 inches of vacuum. A total of 170 parts of phenol were removed by the distillation. The product was a hard polymer with a phosphorus content of 8.1%.

Example 8

310 parts of triphenyl phosphite and 165 parts of hydroquinone were mixed and subjected to vacuum distillation. Terminal conditions were 195° C. and 29 inches of vacuum. 215 parts of phenol were removed. The product was a solid resinous polymer containing 11% phosphorus.

Example 9

165 parts of pyrocatechol was dried azeotropically by distilling 100 parts of toluene from a mixture of the pyrocatechol and the toluene. To the dry pyrocatechol was added 310 parts of triphenyl phosphite. Phenol was then removed from the system by distillation at 28.5 to 29.5 inches of vacuum with a maximum still temperature of 178° C. 260 parts of phenol were removed, leaving a liquid still residue which was a solid at room temperature. The phosphorus content of this solid was 14.4%.

Example 10

341 parts of triphenyl phosphite, 150 parts of 1,4-cyclohexanedimethanol and 6 parts of diphenyl phosphite were mixed and subjected to vacuum distillation. Terminal conditions were 158° C. and 5 mm. Hg absolute pressure. 210 parts of distillate were removed. The product was a clear white solid resinous polymer with a phosphorus content of 12%.

Example 11

2160 parts of hydrogenated bisphenol A, 1860 parts of triphenyl phosphite and 24 parts of diphenyl phosphite were mixed and subjected to vacuum distillation. Terminal conditions were 205° C. and 29.5 inches of vacuum. 1140 parts of distillate were removed. The still residue was a clear solid resin with a phosphorus content of 6.4%. This product is one of the preferred ones according to the invention.

As indicated a preferred series of solid phosphite resins or polymers is prepared from triphenyl phosphite and hydrogenated bisphenol A in which the reactants are used in the molecular proportions to provide equal mols of replaceable phenol and hydroxyl groups, i.e. 2 mols of triphenyl phosphite (TPP) and 3 mols of hydrogenated bisphenol A (HBPA).

Varying amounts of phenol are removed from this system to provide increased phosphorus content, increased molecular weights and decreased amounts of free hydroxyl groups. Thus by reacting the 2 mols of TPP with 3 mols of HBPA and stripping out 4 mols of phenol there is formed a first polymer unit which has the following formula

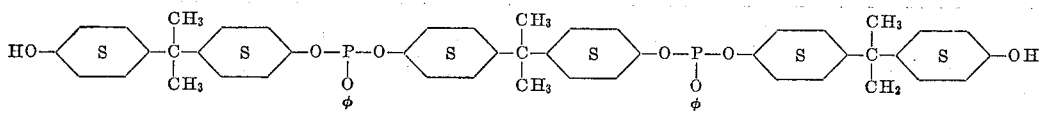

This unit will be referred to hereinafter as a Triad and the letter "$n$" used to designate the number of such Triad units in the polymer molecule.

Thus when $n$ is one as in the indicated formula the molecular weight is 964, the phosphorus content is 6.4% and the hydroxyl number is 116.

In the event that 4.5 mols of phenol are stripped out (9 mols from 2 Triads) the formula of the product is

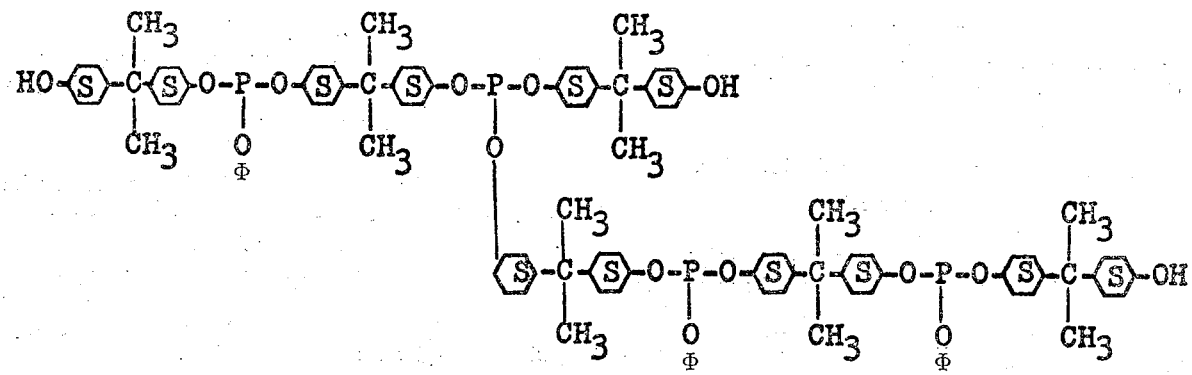

having a molecular weight of 1834, phosphorus content of 6.7% and a hydroxyl number of 91.

If 4.67 mols of phenol are stripped out (14 mols from 3 Triads) the formula of the product is

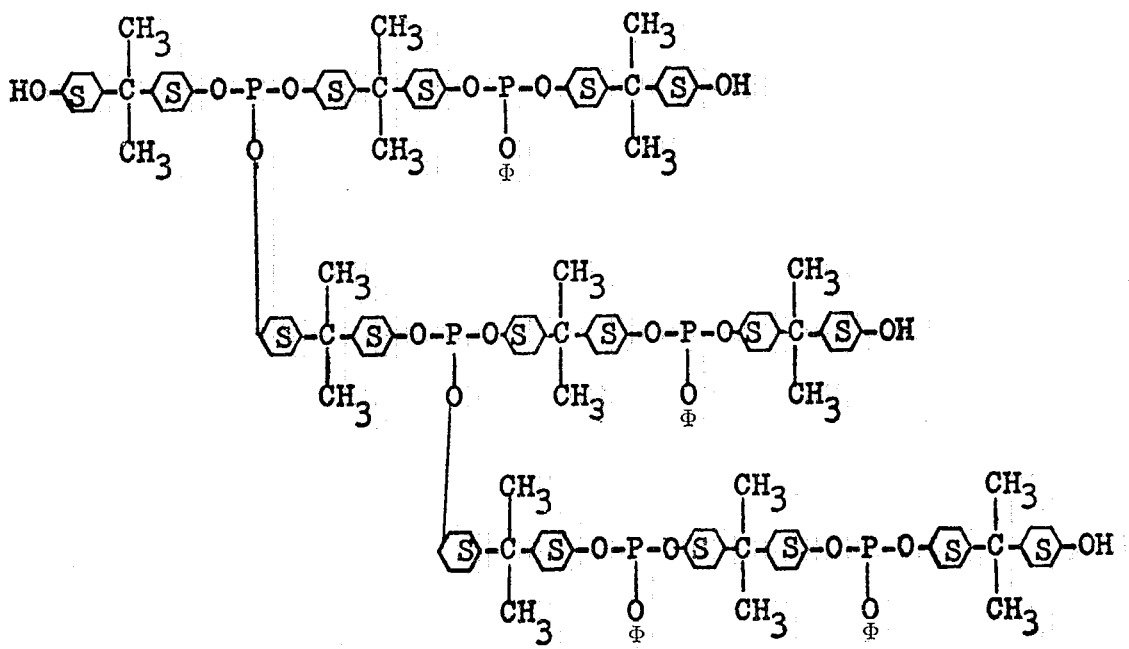

having a molecular weight of 2704, phosphorus content of 6.8% and hydroxyl number of 82.

The following table summarizes the products obtained by reacting TPP with HBPA in the ratio of 2 mols to 3 mols.

Example 14

The procedure of Example 4 was repeated using 2112 parts of tris (4-methylphenyl) phosphite in place of the triphenyl phosphite. There were removed 1280 parts of distillate to give a solid resin.

TABLE 1

| Triads n | Phenols Out (Mols) | | Molecular Wt. of Polymer | P, Atoms/ Molecule | P, Percent | Hydroxyl | |
|---|---|---|---|---|---|---|---|
| | Total | Per "n" | | | | Groups/ Molecule | No. |
| 1 | 4 | 4 | 964 | 2 | 6.4 | 2 | 116 |
| 2 | 9 | 4.5 | 1,834 | 4 | 6.7 | 3 | 91 |
| 3 | 14 | 4.67 | 2,704 | 6 | 6.8 | 4 | 82 |
| 4 | 19 | 4.75 | 3,574 | 8 | 6.9 | 5 | 79 |
| 5 | 24 | 4.80 | 4,444 | 10 | 7.0 | 6 | 76 |
| 6 | 29 | 4.83 | 5,314 | 12 | 7.0 | 7 | 74 |
| 7 | 34 | 4.85 | 6,184 | 14 | 7.03 | 8 | 72.8 |
| 8 | 39 | 4.86 | 7,054 | 16 | 7.03 | 9 | 71.6 |
| 9 | 44 | 4.88 | 7,924 | 18 | 7.04 | 10 | 70.8 |
| 10 | 49 | 4.89 | 8,794 | 20 | 7.05 | 11 | 70.2 |
| 11 | 54 | 4.91 | 9,664 | 22 | 7.05 | 12 | 69.7 |
| 12 | 59 | 4.91 | 10,534 | 24 | 7.05 | 13 | 69.2 |
| 17 | 84 | 4.94 | 14,884 | 34 | 7.1 | 18 | 67.8 |
| Cross linked | | 6.0 | | | 7.98 | 0 | 0 |

Example 12

The procedure of Example 11 was repeated but the distillation was continued until 1271 parts of distillate were collected. The still residue was a clear solid resin with a phosphorus content of 6.7%. This product is one of the preferred ones according to the invention.

Example 13

1665 parts of tetrachlorobisphenol A (2,6,2',6'-isopropylidene tetrachlorodiphenol), 930 parts of triphenyl phosphite and 25 parts of diphenyl phosphite were mixed and subjected to vacuum distillation. Terminal conditions were 235° C. and 29.5 inches of vacuum. A total of 543 parts of distillate was removed. The still residue was a solid resinous polymer containing 4.5% phosphorus and 31% chlorine. It was suitable for incorporation in film forming resins for purposes of stabilization and flame proofing.

Example 15

1 part of the resin prepared in Example 4 was mixed with 100 parts of vinyl chloride resin (Geon 103 Ep) to give a stabilized composition.

Example 16

2 parts of the resin of Example 4 were mixed with 100 parts of solid polypropylene (melt index 0.8).

Example 17

1 part of the resin prepared in Example 11 and 2 parts of barium-cadmium laurate were mixed with 100 parts of polyvinyl chloride and 50 parts of dioctyl phthalate to give a stabilized product.

Example 18

One part of the product of Example 12 was mixed with 100 parts of polypropylene (melt index 0.4).

Example 19

A solid resinous product was obtained using the procedure of Example 4 but employing 2 moles of triphenyl phosphite, 3 moles of dihydroxy diphenyl sulfone and 12 parts of diphenyl phosphite.

As previously indicated, different types of products are obtained if two moles of a triaryl phosphite or trialkyl phosphite, or trihaloaryl phosphite or a mixed dialkyl aryl phosphite or alkyl diaryl phosphite are reacted with one mole of a bisphenol or hydrogenated bisphenol to form a compound having the formula

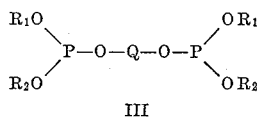

III where $R_1$ and $R_2$ are alkyl, aryl or haloaryl and Q is residue of a dihydric phenol or hydrogenated dihydric phenol. In some of the compounds, at least two of $R_1$ and $R_2$ are alkyl. To prepare compounds having Formula III there can be reacted any of the triaryl phosphites or trialkyl phosphites set forth previously with any of the bisphenols or hydrogenated bisphenols set forth previously. Additionally, there can be used triaryl phosphites such as tris (p-nonylphenyl) phosphite, tris (m-ethylphenyl) phosphite, tris (p-t-octylphenyl) phosphite, tris (p-dodecylphenyl) phosphite, phenyl bis (p-nonylphenyl) phosphite, tris (O-hexadecylphenyl) phosphite, tris (p-cyclohexylphenyl) phosphite, decyl bis (butylphenyl) phosphite, and bis (dodecyl) nonylphenyl phosphite. Usually a dialkyl or diaryl phosphite or an alkaline catalyst is also employed in an amount of 0.1–10%. The compound of Formula III can also be prepared by reacting 1 mole of a bisphenol, e.g., bisphenol A, or a hydrogenated bisphenol, e.g., hydrogenated bisphenol A, with 2 moles of phosphorus trichloride and 4 moles of monohydric phenol, e.g., p-nonylphenol.

The compounds of Formula III are good stabilizers and antioxidants for natural rubber, synthetic rubber, e.g., butadiene-styrene copolymer, vinyl chloride resins, olefin polymers, e.g., polyethylene, polypropylene and ethylene-propylene copolymers and also are good lubricants. They are excellent stabilizers for rigid vinyl chloride resins.

It has been found that the most hydrolytically stable and best compounds in Formula III are derivatives of hydrogenated bisphenol A. They are considerably superior to the corresponding compounds from bisphenol A although the latter are also useful.

Examples of compounds within Formula III are tetra phenyl bisphenol A diphosphite, tetra p-nonylphenyl bisphenol A diphosphite, tetra p-hexadecylphenyl bisphenol A diphosphite, tetra p-methylphenyl bisphenol A diphosphite, tetra decyl bisphenol A diphosphite, tetra dodecyl bisphenol A diphosphite, di decyl di phenyl bisphenol A diphosphite, tetra p-t-octylphenyl bisphenol A diphosphite, tetra phenyl hydrogenated bisphenol A diphosphite, tetra p-nonylphenyl hydrogenated bisphenol A diphosphite, tetra p-octylphenyl hydrogenated bisphenol A diphosphite, tetra p-t-octylphenyl hydrogenated bisphenol A diphosphite, tetra m-methylphenyl hydrogenated bisphenol A diphosphite, tetra p-hexadecylphenyl hydrogenated bisphenol A diphosphite, tetra decyl hydrogenated bisphenol A diphosphite, di phenyl di decyl hydrogenated bisphenol A diphosphite, tetra dodecylphenyl hydrogenated bisphenol A diphosphite, tetraphenyl di(4-hydroxy-3-methylphenyl) dimethyl methane diphosphite, tetraphenyl di(4-hydroxy-3-methylcyclohexyl) dimethyl methane diphosphite, tetra dodecylphenyl di(4-hydroxy-3-methylphenyl) dimethyl methane diphosphite, tetraphenyl di(4-hydroxyphenyl) methyl methane diphosphite, tetraphenyl di(4-hydroxycyclohexyl) methyl methane diphosphite, tetra octyl di(4-hydroxycyclohexyl) methylmethane diphosphite, tetra nonylphenyl di(4-hydroxyphenyl) methyl ethyl methane diphosphite, tetra nonylphenyl di(4 - hydroxycyclohexyl) methyl ethyl methane diphosphite, tetra ethylphenyl di(4-hydroxy-3-methylphenyl) phenyl methane diphosphite, tetra methylphenyl di(4 - hydroxy-3-methylcyclohexyl) phenylmethane diphosphite, tetra octylphenyl di(4-hydroxyphenyl) methane diphosphite, tetra octylphenyl di(4-hydroxycyclohexyl) methane diphosphite, tetraphenyl di(4-hydroxyphenyl) sulfone diphosphite, tetra octadecyl di(4-hydroxyphenyl) sulfoxide diphosphite, tetra nonylphenyl di(4-hydroxyphenyl) sulfide diphosphite, tetra nonylphenyl di(3-hydroxyphenyl) dimethyl methane diphosphite, tetra octylphenyl di(3-hydroxycyclohexyl) dimethyl methane diphosphite, tetra phenyl tetrachlorobisphenol A diphosphite, and tetra nonylphenyl tetrachlorobisphenol A diphosphite.

Example 20

2 moles of tris (p-nonylphenyl) phosphite, 1 mole of bisphenol A and 0.04 mole of diphenyl phosphite were heated and the p-nonylphenol formed removed by distillation in a vacuum until two moles had been removed. The residue in the pot was tetra (p-nonylphenyl) bisphenol A diphosphite.

Example 21

The procedure of Example 20 was repeated replacing the bisphenol A by hydrogenated bisphenol A to produce tetra (p-nonylphenyl) hydrogenated bisphenol A diphosphite.

Example 22

2 moles of triphenyl phosphite, 1 mole of hydrogenated bisphenol A and 0.03 mole of diphenyl phosphite were heated and the phenol formed removed by distilling in a vacuum until 2 moles of phenol were recovered. The product in the pot was tetra phenyl hydrogenated bisphenol A diphosphite.

Example 23

The procedure of Example 22 was repeated replacing the triphenyl phosphite by 2 moles of tris (p-t-octylphenyl) phosphite to produce tetra (p-t-octylphenyl) hydrogenated bisphenol A diphosphite.

Example 24

The procedure of Example 22 was repeated replacing the triphenyl phosphite by 2 moles of tris (p-n-octylphenyl) phosphite to produce tetra (p-n-octylphenyl) hydrogenated bisphenol A diphosphite.

In general the products of Formula III are liquids when the $R_1$ and $R_2$ groups are alkyl below 12 carbon atoms or the $R_1$ and $R_2$ groups are normal alkaryl having up to 9 carbon atoms in the alkyl portion.

An example of a mixed phosphite having Formula III is given below.

Example 25

2 moles of octyl diphenyl phosphite, 1 mole of hydrogenated bisphenol A and 0.03 mole of diphenyl phosphite are heated as in Example 22 to form the compound:

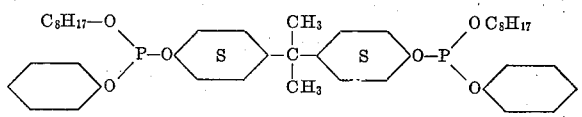

where S indicates that the ring is saturated.

Example 26

600 grams (2.5 moles) of hydrogenated bisphenol A, 2200 grams (10 moles) of p-nonylphenol, 1550 grams of triphenyl phosphite and 25 grams of sodium phenolate (catalyst) were heated and distilled in a vacuum for 1 hour and 40 minutes to remove the phenol formed. The temperature in the pot rose from 116 to 190° C. during this time. The liquid residue in the pot was filtered off to recover tetrakis (p-nonylphenyl) hydrogenated bisphenol A diphosphite as the desired product in an amount of 2625 grams. The product can also be called tetra (p-nonylphenyl) bis (cyclohexylene) dimethyl methane diphosphite. This example illustrates the use of tris higher alkaryl phosphite which is formed in situ from a higher alkylphenol and triphenyl phosphite.

In place of sodium phenolate catalyst there can be used other alkaline catalysts, e.g., sodium cresylate, sodium nonylphenolate, sodium decylate or potassium phenolate or there can be used dialkyl or diaryl phosphite.

*Example 27*

1240 parts of triphenylphosphite, 1300 parts of isodecyl alcohol, 480 parts of hydrogenated bisphenol A and 15 parts of diphenyl phosphite were mixed and subjected to vacuum distillation. Terminal conditions were 181° C. and 10 Torr. 1033 parts of distillate were removed from the reaction vessel in the process. The residue in the pot was treated with 6 parts sodium carbonate, 6 parts Attagel (silica gel) and 10 parts Hi-Flo filter aid. The mixture was filtered off, the filtrate had the following properties R.I. 1.4891; sp. gr. 0.963, Acid No. 0.19, Color, A.P.H.A. 20. The filtrate was tetradecyl hydrogenated bisphenol A diphosphite. This compound can also be called tetra decyl bis (cyclohexylene) dimethyl methane diphosphite.

*Example 28*

480 parts of hydrogenated bisphenol A, 1760 parts of p-nonylphenol, 1240 parts of triphenyl phosphite and 12 parts of diphenyl phosphite were mixed and subjected to vacuum distillation. Terminal conditions were 200° C. and 10 Torr. 1055 parts of distillate was removed and had a set point of 40.0° C. The residue was agitated with 15 parts of Hi-Flo, 12 parts Attagel and 7 parts soda ash and filtered. The tetrakis (p-nonylphenyl) hydrogenated bisphenol A diphosphite was a viscous liquid with a R.I. of 1.5310 at 25° C. and an acid number of 0.013.

*Example 29*

2 moles of triphenyl phosphite, 1 mole of 2,6,2',6'-tetrachloro bisphenol A and 0.04 mole of diphenyl phosphite were heated and the phenol formed removed by vacuum distillation until 2 moles had been removed. The residue in the pot was tetraphenyl 2,6,2',6'-tetrachlorobisphenol A diphosphite.

*Example 30*

The procedure of Example 29 was repeated using 2 moles of tris (p-nonylphenyl) phosphite in place of the triphenyl phosphite to obtain tetrakis (p-nonylphenyl) 2,6,2',6'-tetrachlorobisphenol A disphosphite as the product.

*Example 31*

The procedure of Example 29 was repeated using 2 moles of tris decyl phosphite in place of triphenyl phosphite to obtain tetrakis (decyl) 2,6,2',6'-tetrachlorobisphenol A diphosphite as the product.

*Example 32*

2480 grams (8 moles) of triphenyl phosphite, 816 grams (4 moles) of

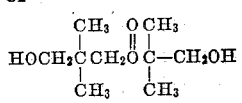

(2,2-dimethyl-3-hydroxypropyl ester of alpha,alpha dimethyl beta hydroxypropionic acid) were heated with 21 grams of diphenyl phosphite in a vacuum until 8 moles of phenol were recovered. The residue in the pot was

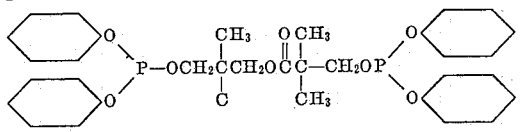

This compound is useful as a stabilizer and antioxidant for natural rubber, synthetic rubber, e.g. butadiene-styrene copolymer vinyl chloride resins, olefin polymers, e.g. polyethylene, polypropylene and ethylenepropylene copolymers.

A similarly useful product is obtained if the triphenyl phosphite employed in Example 32 is replaced by 8 moles of tris (p-nonylphenyl) phosphite or 8 moles of tris (p-t-octylphenyl) phosphite or 8 moles of tris (decyl) phosphite.

The novel compounds of the invention having the formula

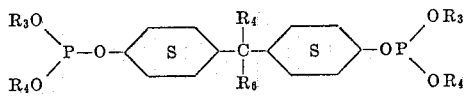

where $R_3$ and $R_4$ are hydrocarbyl, e.g. alkyl or aryl, and $R_5$ and $R_6$ are hydrogen or alkyl can also be called di(dihydrocarbylphosphitocyclohexyl) alkylidene.

In the claims where more than one R group is present the R groups can be the same or different.

In the specification and claims the letter "S" in a benzene ring indicates that the ring is fully saturated.

What is claimed is:

1. A compound having the formula

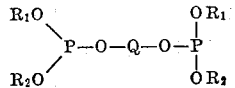

where $R_1$ and $R_2$ are selected from the group consisting of alkyl of 8–18 carbon atoms, aryl and haloaryl and at least two of $R_1$ and $R_2$ are alkyl and Q is the divalent residue of a member of the group consisting of a dihydric phenol and a hydrogenated dihydric phenol.

2.

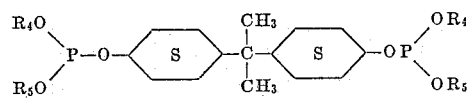

where $R_4$ is a monocyclic carbocyclic aryl group and $R_5$ is alkyl of 8–18 carbon atoms.

3.

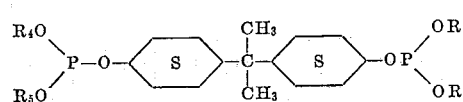

where $R_5$ is alkyl of 8–18 carbon atoms.

4. Di(dialkylphosphito dichlorophenyl) isopropylidene wherein the alkyl group has 8–18 carbon atoms.

References Cited

UNITED STATES PATENTS 2,643,265  6/1953  Toy _____ 260—930
3,037,608  7/1962  Friedman et al. _____ 260—982
3,239,464  3/1966  Matson et al. _____ 260—928 X CHARLES B. PARKER, *Primary Examiner.*

A. H. SUTTO, *Assistant Examiner.*